May 24, 1966  KATSUJI HIRAHARA  3,252,804
METHOD OF AND APPARATUS FOR MOISTURIZING
CEREAL GRAIN OR THE LIKE
Filed June 25, 1963
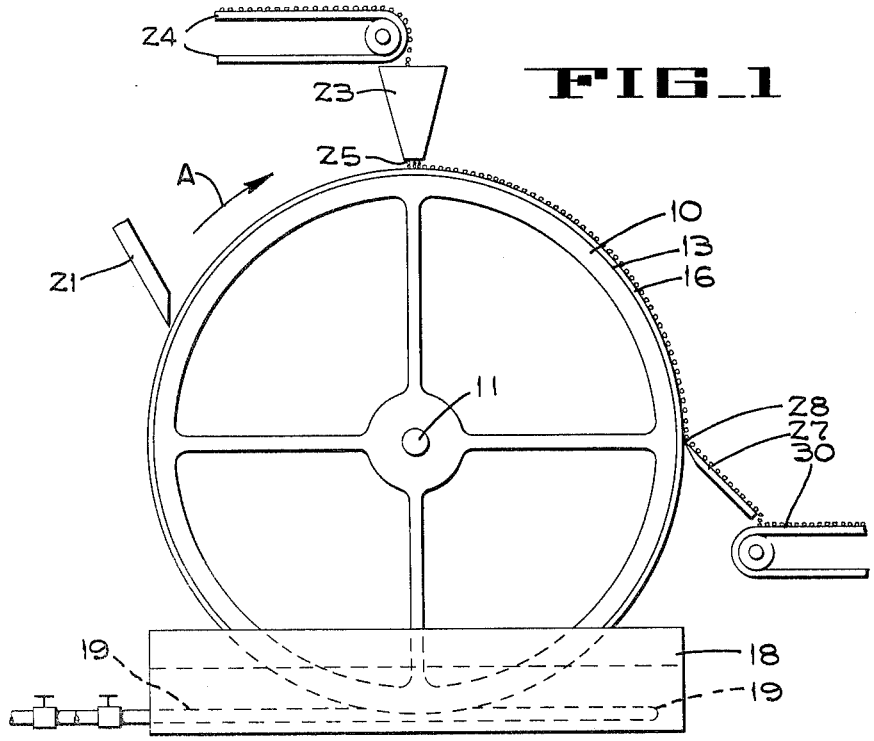
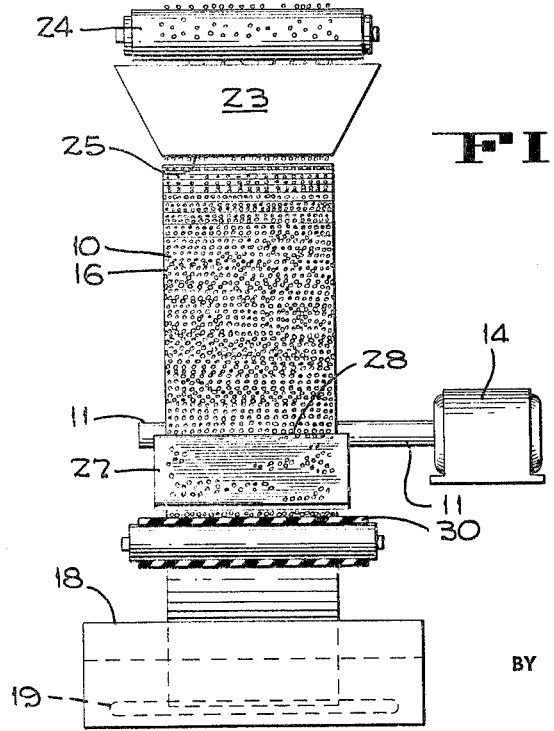
INVENTOR
KATSUJI HIRAHARA
BY *Hans G. Hoffmeister*
ATTORNEY

3,252,804
METHOD OF AND APPARATUS FOR MOISTURIZING CEREAL GRAIN OR THE LIKE
Katsuji Hirahara, San Jose, Calif., assignor to FMC Corporation, San Jose, Calif., a corporation of Delaware
Filed June 25, 1963, Ser. No. 290,489
9 Claims. (Cl. 99—80)

The present invention pertains to a method of and apparatus for the moisturizing of water-absorbing, granular materials such as cereal grain or the like and more particularly to a method and apparatus for the uniform application of moisture throughout a cereal grain material prior to its being pre-cooked to aid in preventing localized overcooked or undercooked portions in the final food product.

The controlled and uniform application of moisture to water absorbent food material has always posed a special problem for the food processing industry. This is particularly true in the case of fine or ground granular materials such as cereal grain or the like which are normally pre-cooked before being put on the retail market. For example, the pre-cooking of farina, a well-known, ready-to-eat cereal product, generally necessitates a moisture content of about 28% prior to the application of heat thereto.

Cereal food products are normally processed or pre-cooked under steam or under other conditions which will maintain the desired moisture level in the product during the cooking process. It is imperative that uniform moisture distribution be maintained in the material in order to obtain uniform gelatinization of the pre-cooked product. This proper and uniform moisture content assures that the individual particles or grains of the cereal will not adhere to each other to form lumps in the oversaturated portions. That is to say, if the moisture is not evenly distributed in the uncooked cereal, some localized areas thereof will have a relatively higher moisture content than that of the moistened cereal in general. When this moistened material is cooked, those portions possessing a higher moisture content will soften to a greater extent than the other portions and the particles will lump together to form localized soft spots. Likewise, portions which are not properly moisturized may, of course, be over-cooked resulting in the conversion of the starch to dextrin and subsequent burning. Because of the hygroscopic character of cereal grain products and the like, great difficulty has heretofore been experienced in the attempts to find a way of quickly and inexpensively providing the dry granular material with a uniform moisture content.

It is, therefore, an object of the present invention to provide an improved method for uniformly applying a predetermined moisture content to food products such as cereal grain or the like.

Another object of the present invention is to provide inexpensive and efficient apparatus for carrying into operation the aforementioned method.

Another object is to provide a method for uniformly moisturizing fine grain food material or the like which method includes various control procedures to assure a high degree of efficiency.

These and other objects and advantages of the present invention will become apparent from the following description and the accompanying drawings, in which:

FIGURE 1 is a diagrammatic side elevation of the apparatus of the present invention.

FIGURE 2 is a diagrammatic end elevation of the apparatus of FIGURE 1.

In accordance with the present invention a rotary drum type conveyor having a smooth, oil-free and grease-free conveying surface is used to carry a predetermined amount of water to a position wherein it may be uniformly absorbed by a controlled quantity of cereal grain or the like. The conveyor is continuously driven and the cereal grain can be moisturized continuously so that the whole operation proceeds at a rapid and efficient rate.

Referring now more particularly to the drawings, the apparatus of the present invention is seen to include a drum 10 which is mounted upon a shaft 11 for rotation about a horizontal axis. The drum is provided with an outer cylindrical surface 13 of substantial width which surface is moved in the direction indicated by the arrow A during rotation of the drum. The drum may be driven by any suitable power driving means, such as a motor 14 shown in FIGURE 2. The surface 13 is covered with a thin, impervious sheet of rubber material 16. The sheet 16 may be made of any natural or synthetic rubber, such as neoprene, the surface of which is hydrophilic and easily wetted. It should be understood that this surface must be kept free of any grease or oil so that it may be suitable to receive a thin film of water thereon. If desired, the rubber sheet may be omitted and the water applied directly to the cylindrical surface of the steel drum; however, this surface must be kept clean and grease-free to permit the attainment of a uniform water film thereon.

The lowermost portion of the drum 10 extends into a tank 18 which is partially filled with water to establish a water bath which may be heated by means of a heating coil 19 through which a heating medium such as steam or hot water may be circulated. Suitable control means (not shown) may be provided to maintain the water in the tank 18 at the desired temperature level. As the sheet 16 on the cylindrical surface 13 of the drum is brought into contact with the heated water in the tank, a certain amount of water is picked up and retained thereon. A metal blade 21 (FIGURE 1) is positioned adjacent to the exterior surface of the drum at a location slightly spaced from the tank 18 in the direction A of rotation of the drum. The blade is adjustably secured adjacent to the rubber sheet 16 (by means not shown) and is slightly spaced from the surface of the sheet a distance corresponding to the thickness of the water film to be applied thereto. The blade 21, therefore, aids in spreading the heated water from the tank 18 evenly on the surface of the sheet and regulates the thickness of the film. The heating of the water bath both reduces the surface tension of the water to aid in the formation of a film on the conveying surface and promotes the absorption of the water film by the granular material deposited thereon.

The cereal grain or other foodstuffs to be moisturized is applied to the water film on the surface of the rubber sheet 16 by means of a hopper 23 positioned directly over the uppermost portion of the drum and extending throughout the full width of the drum surface as shown in FIGURE 2. The hopper is continuously supplied with the granular material by means of a conventional endless conveyor 24. The hopper is provided with a narrow mouth 25 directly adjacent to the surface of the drum so as to apply a limited and controlled amount of material to the drum during a given time interval to assure the proper spreading of the material over the wetted surface of the drum. The hopper may be provided with conventional agitating means and sifting means to further aid in the controlled feeding and spreading of the grain material and, if desired, an adjustable flow control member, such as a slidable plate, may be provided at the mouth 25 to meter the discharge of the material.

Positioned immediately adjacent to the drum, approximately one-quarter revolution from the position of the hopper, is a metal knife blade 27 which has a laterally extending edge 28 located in contact with or close enough to the surface of the rubber sheet 16 so as to scrape all particles of grain or the like therefrom. However, it is intended that the knife blade should not interfere with the free rotation of the drum. The blade 27 is angled downwardly from its upper edge 28 to form a chute directed towards a take-away conveyor 30 of the endless belt type which receives the granular material scraped from the drum and conveys it to further processing means such as a cooker (not shown).

During operation of the apparatus of the present invention, the water in the tank 18 is first brought to the proper temperature by means of the heating unit 19. The drum 10 is then set into motion, rotating in the direction of the arrow A, and the rubber sheet 16 on the cylindrical exterior surface 13 of the drum is allowed to accumulate a water film thereon from the water bath. The blade 21 assures the spreading of the water over the entire surface of the rubber sheet 16 in the form of a fine film of uniform thickness. This film remains on the rubber surface of the drum subject only to evaporation due to natural conditions and absorption by the granular material applied thereto during continued rotation of the drum. The hopper 23 deposits a continuous layer of cereal grain or the like upon the wetted surface as the drum is rotated past the position of the hopper with the amount of grain being controlled so that substantially each particle thereof will be placed in absorbing contact with the water film. While the granular material is rotated on the drum from the hopper position to the position of the knife blade 27, it will continuously absorb moisture from the surface film. At the knife blade 27, the individual particles are scraped off the drum.

The drum speed is so regulated that the sheet 16 on the surface of the drum will contain no loose water at the position of the knife blade 27. That is to say, the combination of the evaporation of the water plus the absorption of the water by the cereal grain material, will result in the complete removal of all excess water from surface sheet 16 leaving such sheet in, at most, a slightly damp state. This condition of the conveying surface prevents the scraping off of water with the grain and aids in achieving the proper, predetermined moisture content in the grain.

In further describing the moisturizing method of the present invention, the ground cereal grain product known as farina will be used by way of example. It is in accordance with the invention, however, that other highly absorbent, granular food products may also be utilized in the practice of the method and apparatus set forth herein.

Farina must be mixed with water in the proper proportions wherein the moistened product contains about 28% moisture by weight prior to its being pre-cooked or gelatinized for sale to the housewife as an instant breakfast cereal. The primary difficulty with using normal or conventional methods of adding a given amount of water to a given amount of farina, is that the farina particles absorb water quite rapidly. This promotes an uneven distribution of moisture throughout any given quantity of the material unless extreme care is used in the moistening process. To obtain a uniform gelatinization of the cereal upon cooking, it is imperative that there be uniform moisture distribution as previously pointed out.

In practicing the method of the present invention with farina, the water bath temperature is maintained from 160° F. to 180° F., the exact temperature depending to some extent upon the rotational speed of the drum and the existing external conditions. The drum is rotated at about 1½ to 3 r.p.m. This exposes the grain to the water film for about 5 to 10 seconds between the position of the hopper 23 and the scraping knife blade 27. It is during this exposure period, of course, that the farina particles will absorb all of the loose water present in the thin film on the drum surface other than that small amount which would undergo natural evaporation. It will be understood that the temperature of the water, the rotational speed of the drum, and the relative positions of the grain feeding hopper and the grain removing blade, can be relatively adjusted and regulated so as to secure the optimum moisture content for the farina in its final condition in the most rapid and efficient manner. These operating factors can very easily be determined experimentally in the laboratory.

In addition to the aforementioned variable operating factors, the water film can be controlled by varying the spacing of the blade 21 with respect to the drum surface. This will, of course, permit an increase or decrease in the thickness of the water film thereby providing for the processing of more or less material per unit area of drum surface and either increasing or decreasing the evaporation rate of the film.

The temperature of the water in the water bath also has considerable control over the moisture content of the grain in its final condition. Lowering the temperature of the water tends to increase the thickness of the film on the drum, whereas raising the temperature tends to reduce the film thickness and render it more uniform over the entire surface area while increasing the evaporation rate of the water on the drum. Higher water temperature increases the rate at which the water is absorbed by the grain, but it has been found that a water temperature of 180° F. is a maximum since a higher temperature tends to cook the grain upon the drum.

Modification might be made in the illustrated apparatus without departing from the spirit or the scope of the present invention. For example, if it is found that certain cereal grains or other hygroscopic granular materials do not absorb enough moisture when using the described apparatus, the addition of a water mist spray might be included adjacent that portion of the drum which contains the wetted material undergoing absorption. This will subject the particles to moisture not only on the side contacting the wetted surface sheet 16, but also on the side remote therefrom. It will be apparent that this will hasten the moisture absorbtion rate. In addition, an endless flat belt conveyor might be substituted for the rotary drum conveyor is so desired.

It will be seen that the present invention provides a method of and apparatus for moisturizing cereal grain or the like whereby the individual particles can be continuously received from a moving conveyor, carried over a surface having a predetermined temperature-controlled water film thereon where they uniformly absorb a predetermined amount of moisture, and continuously removed therefrom to be carried to further processing units. The apparatus, which is simple in nature, permits the rapid and efficient handling of large quantities of cereal grain or like granular materials. It has great advantages over the former mixing or spraying methods of moisture application because of the very high uniformity of the moistened material.

While but one embodiment of the present invention has been illustrated, it will be understood that various changes and modifications, other than those hereinbefore mentioned, may be made therein without departing from the spirit of the invention or the scope of the appended claims.

The invention having thus been described, what is believed to be new and desired to be protected by Letters Patent is:

1. A method of uniformly moisturizing farina to a predetermined moisture content comprising the steps of heating a water bath to a predetermined temperature of from about 160° F. to about 180° F., moving a conveying surface through said water bath to apply a thin film of water thereon, controlling the thickness of said water film, applying said farina in a controlled manner to the wetted surface to assure that substantially each particle thereof will be in absorbing contact with the water film and allowing the farina to remain on said surface for a predetermined period of time sufficient to uniformly moisturize said farina, and removing the farina without any loose water adhering thereto from said surface at the expiration of said predetermined period of time.

2. Moisturizing apparatus for giving a predetermined uniform moisture content to cereal grain comprising conveying means having a smooth surface portion free of grease and oil, means for continuously driving said conveying means to move said surface portion through a closed loop path, a water bath in one section of said path for applying a water film to said surface portion, means for heating said water bath to control the characteristics of said water film, means spaced from said water bath for applying said grain in controlled amounts to said surface portion so that substantially each grain particle will be in absorbing contact with said water film, a scraper blade arranged adjacent to said surface portion at a position spaced from said grain applying means, said blade being positioned so as to scrape said grain from said surface after the attainment by the grain of said predetermined moisture content.

3. Moisturizing apparatus for giving a predetermined uniform moisture content to cereal drain comprising a conveying means having a smooth exterior surface substantially free of any grease or oil, means for continuously driving said conveying means to move said surface in a closed loop path, a water bath positioned at the bottommost portion of said conveying means and occupying a portion of said path, means for heating said water bath whereby said heated water bath is capable of creating a water film on said surface, means for controlling the thickness of said film, a hopper positioned at the uppermost portion of said conveying means for applying a controlled amount of said grain to the wetted surface of the conveying means, and a scraper blade positioned adjacent to said path and spaced from said hopper for scraping said grain from the surface.

4. Apparatus for uniformly moisturizing cereal grain comprising a drum having a smooth, hydrophilic cylindrical surface, means for continuously rotating said drum, a water bath positioned below said drum so as to immerse a portion of said cylindrical surface and apply a thin water film thereon, means for applying a thin layer of said grain to the surface of said drum upon its acquisition of said water film, scraper means spaced from said grain applying means for removing moisturized grain from the surface of said drum, and means for heating the water bath to a temperature such that said water film will be completely evaporated and absorbed by said grain when it is rotating to the position of said scraper means.

5. The apparatus of claim 4 wherein said surface is a rubberlike material.

6. The apparatus of claim 4 wherein said surface is neoprene.

7. The apparatus of claim 4 wherein said surface is an oil-free metallic surface.

8. The apparatus of claim 4 wherein said drum surface is rotated 180° between said water bath and said grain applying means and an additional 90° between said grain applying means and said scraper means.

9. Moisturizing apparatus for giving a predetermined uniform moisture content to cereal grain or the like comprising conveying means having a smooth surface portion, means for continuously driving said conveying means, a water bath positioned in a portion of the path of the conveying means for applying water to said surface portion, means for applying cereal grain or the like to said surface portion at a location spaced downstream in the direction of movement of the surface portion from said water bath, means positioned between said water bath and said grain applying means for applying said water film in a predetermined and uniform thickness over said surface portion of the conveying means, and scraper means spaced downstream from said grain applying means for scraping said grain from said surface portion upon the attainment thereby of said predetermined moisture content.

References Cited by the Examiner
UNITED STATES PATENTS

| | | | |
|---|---|---|---|
| 1,415,851 | 5/1922 | Peterson. | |
| 1,972,666 | 9/1934 | Pays. | |
| 2,163,628 | 6/1939 | Pilkey. | |
| 2,198,597 | 4/1940 | Baer. | |
| 2,348,800 | 5/1944 | Fredrickson | 118—13 |
| 2,937,946 | 5/1960 | Ozai-Durrani | 99—80 |

A. LOUIS MONACELL, *Primary Examiner.*

RAYMOND N. JONES, *Examiner.*

UNITED STATES PATENT OFFICE
CERTIFICATE OF CORRECTION

Patent No. 3,252,804                                                       May 24, 1966

Katsuji Hirahara

It is certified that error appears in the above identified patent and that said Letters Patent are hereby corrected as shown below:

Column 4, line 43, "is" should read -- if --. Column 5, line 7, after "grain" insert -- or the like --; line 24, "drain" should read -- grain --.

Signed and sealed this 17th day of March 1970.

(SEAL)
Attest:

Edward M. Fletcher, Jr.                                    WILLIAM E. SCHUYLER, JR.
Attesting Officer                                                            Commissioner of Patents